US006861470B2

(12) United States Patent
Watanabe et al.

(10) Patent No.: US 6,861,470 B2
(45) Date of Patent: Mar. 1, 2005

(54) THERMOPLASTIC ELASTOMER COMPOSITION AND PROCESS FOR PRODUCING THE SAME AND PNEUMATIC TIRE AND HOSE USING THE SAME

(75) Inventors: Jiro Watanabe, Hiratsuka (JP); Kazuto Yamakawa, Hiratsuka (JP); Daisuke Kanenari, Hiratsuka (JP); Noriaki Kuroda, Kawasaki (JP); Gou Kawaguchi, Hiratsuka (JP); Yuichi Hara, Hiratsuka (JP); Tetsuji Kawazura, Hiratsuka (JP); Shigeru Yamauchi, Hiratsuka (JP); Hideo Nemoto, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 96 days.

(21) Appl. No.: 10/347,283

(22) Filed: Jan. 21, 2003

(65) Prior Publication Data

US 2003/0181592 A1 Sep. 25, 2003

Related U.S. Application Data

(62) Division of application No. 09/800,782, filed on Mar. 8, 2001, now Pat. No. 6,538,066, which is a division of application No. 09/380,588, filed as application No. PCT/JP99/00019 on Sep. 9, 1999, now Pat. No. 6,359,071.

(30) Foreign Application Priority Data

Jan. 13, 1998 (JP) ................................. 10-5028
Aug. 21, 1998 (JP) ............................. 10-235386
Nov. 25, 1998 (JP) ............................. 10-333922

(51) Int. Cl.$^7$ .............................................. C98L 77/00
(52) U.S. Cl. ..................... 525/55; 525/184; 525/191; 152/510
(58) Field of Search ..................... 525/55, 184, 191; 152/510

(56) References Cited

U.S. PATENT DOCUMENTS

| 5,851,323 | A | | 12/1998 | Kaido et al. |
| 6,013,727 | A | | 1/2000 | Dharmarajan et al. |
| 6,037,418 | A | * | 3/2000 | Mukai et al. ................ 525/242 |
| 2002/0033557 | A1 | | 3/2002 | Hashimura et al. |

FOREIGN PATENT DOCUMENTS

| JP | A-5-508435 | 11/1993 |
| JP | A-8-244402 | 9/1996 |
| JP | A-9-124848 | 5/1997 |

OTHER PUBLICATIONS

CRC Press, "Nylon 6", Ploymers–A Property Database, LLC, 2000.
CRC Press, "Nylon 11", Polymers–A Property Database, LLC, 2000.

* cited by examiner

Primary Examiner—James J Seidleck
Assistant Examiner—Melanie Bissett
(74) Attorney, Agent, or Firm—Arent Fox PLLC (57) ABSTRACT

A thermoplastic elastomer composition dynamically vulcanized to a gelation rate of 50 to 95% which is superior in heat resistance and durability while maintaining flexibility and superior in air permeation preventive property which can be efficiently used as, for example, a pneumatic tire as an air permeation preventive layer. The method includes mixing a composition (C) mixed under conditions of a ratio of melt viscosities of the rubber composition (A)/resin (B) of 0.8 to 1.2 and the formula $(\phi_A/\phi_B) \times (\eta_B/\eta_A) < 1.0$ under conditions of a ratio of melt viscosities of the rubber composition (D)/composition (C) of 0.8 to 1.2 and the formula $(\phi_D/\phi_C) \times (\eta_C/\eta_D) < 1.0$, wherein $\phi_A$: volume fraction of rubber composition (A), $\phi_B$: volume fraction of resin (B), $\eta_A$: melt viscosity of rubber composition (A), $\eta_B$: melt viscosity of resin (B), $\phi_C$: volume fraction of composition (C), $\phi_D$: volume fraction of rubber composition (D), $\eta_C$: melt viscosity of composition (C), $\eta_D$: melt viscosity of rubber composition (D).

2 Claims, 2 Drawing Sheets

THERMOPLASTIC ELASTOMER COMPOSITION AND PROCESS FOR PRODUCING THE SAME AND PNEUMATIC TIRE AND HOSE USING THE SAME

This is a division of application Ser. No. 09/800,782 filed Mar. 8, 2001, now U.S. Pat. No. 6,538,066 which is a division of application Ser. No. 09/380,588 filed Dec. 7, 1999, now U.S. Pat. No. 6,359,071, which is a 371 of PCT/JP99/00019 filed Sep. 9, 1999. The disclosure of the prior applications is hereby incorporated by reference herein in its entirety.

TECHNICAL FIELD

The present invention relates to a thermoplastic elastomer composition, more particularly relates to a thermoplastic elastomer composition excellent in durability and excellent in resultant tire inside appearance and air permeation preventive property and to a pneumatic tire and hose using the same. The present invention further relates to a process for producing a thermoplastic elastomer composition, more particularly a process for producing a thermoplastic elastomer composition capable of providing a domain rubber having a reduced particle size with a material having a high rubber ratio and a process for producing a pneumatic tire using the same.

BACKGROUND INVENTION

Compositions having a low gas permeation performance (gas barrier performance) composed of thermoplastic resin/thermoplastic resin-based blends such as a high density polyethylene resin and nylon 6 or nylon 66 (HDPE/PA6.66), a polyethylene terephthalate and aromatic nylon (PET/MXD6), a polyethylene terephthalate and vinyl alcohol-ethylene copolymer (PET/EVOH), where one thermoplastic resin is layered over the other layer to form plural layers by molding, and processes for producing the same, are already known from Isao Hata: *Kobunshi* (*Polymers*), 40 (4), p. 244 (1991) etc. Further, an application regarding the use of such a composition as the inner layer of a tire has been already filed by the present assignee (Japanese Patent Application No. 7-55929). However, since these materials are thermoplastic resin/thermoplastic resin blends, while they are superior in gas barrier property, they lack flexibility, and therefore, such films are liable to break when the tire is in running.

Further, there are also examples of use of a thermoplastic elastomer composed of a rubber and a thermoplastic resin for the inner liner or a tire (Japanese Patent Application No. 8-183683), but in general a flexible material superior in durability has a low heat resistance. With a thermoplastic elastomer using a thermoplastic resin having a melting point less than the tire vulcanization temperature as a matrix, when the vulcanization bladder is released at the end of the vulcanization of the tire, the tire inside surface is liable to become poor in appearance due to the thermoplastic resin sticking to the bladder, rubbing with the bladder, etc.

Research directed to the difference in viscosities at the time of processing in mixing of rubbers and resins has been known in the past. Among these, the capability of reducing the domain dispersion particle size the most in the state where the ratio of melt viscosities of the rubber/resin is brought close to 1 (that is, no difference in viscosities) has been reported in S. Wu, *Polym. Eng. Sci.*, 27(5), 1987. If using these technologies to fabricate a thermoplastic elastomer having more flexibility, larger strength and elongation, and superior durability by raising the rubber ratio, while keeping the ratio of melt viscosities of the rubber/resin at 1, the rubber becomes the matrix and thermoplasticity is no longer exhibited.

In a laminate in which dynamic fatigue resistance is required such as tire, hose, when using a gas permeation preventive thermoplastic elastomer composition composed of rubber/resin dispersed therein, it is known to obtain a balance between the flexibility and gas permeation preventive property by making joint use of a flexible N11- or N12-nylon and superior gas permeation preventive property N6- or N66-nylon. Further, the present inventors have proposed to define the volume fraction and melt viscosity using the equation of α:

$$(\phi_d/\phi_m) \times (\eta_m/\eta_d) < 1.0$$

wherein the volume fractions of the continuous phase component and dispersion phase component in the thermoplastic elastomer composition are $\phi_m$ and $\phi_d$ and the melt viscosities of the components are $\eta_m$ and $\eta_d$ and further to bring the ratio of viscosities $\eta_m/\eta_d$ close to 1 to reduce the rubber dispersed particle size of the domain to improve the durability (Japanese Patent Application No. 8-193545, Japanese Patent Application No. 9-175150, and Japanese Patent Application No. 10-235386). However, the durability at low temperatures was insufficient by just reducing the rubber particle size.

DISCLOSURE OF THE INVENTION

An object of the present invention is to solve the above-mentioned problems and to provide a thermoplastic elastomer composition which is excellent in heat resistance and durability, while maintaining the flexibility and to provide the use of the elastomer composition for the air permeation preventive layer of a tire so that, when the elastomer composition is used as the air permeation preventive layer of a tire, it gives a tire excellent in heat resistance and durability, while being excellent in flexibility and, further, does not stick on the shaping bladder and, therefore, is excellent in surface finish as well.

Another object of the present invention is to provide a process for producing a thermoplastic elastomer composition which is free from reversal of the dispersed structure of the resin component as the continuous phase (matrix) and the rubber component as the dispersion phase (domain) even when the rubber ratio is 50% or more and, further, has the properties of being more flexible, large in strength and elongation as well, and superior in durability.

A still further object of the present invention is to provide a thermoplastic elastomer composition having a structure having a blended resin as a matrix and a rubber elastomer dispersed therein, wherein not only the dispersed particle size of the rubber elastomer, but also the structure of the blended resin of the matrix phase are controlled to improve the durability, in particular the durability at low temperatures, while maintaining the air permeation preventive property and a pneumatic tire and hose using that thermoplastic elastomer composition.

In accordance with the present invention, there is provided a thermoplastic elastomer composition comprising an elastomer component containing a nylon resin having a melting point of 170 to 230° C. and a halide of an isobutylene-p-methylstyrene copolymer, which is dynamically vulcanized to a gelation rate of 50 to 95%.

In accordance with the present invention, there is provided a thermoplastic elastomer composition characterized in that the nylon resin is composed of nylon 11 or nylon 12 and nylon 6/66 copolymer at a ratio of 10/90 to 90/10, in that a molecular weight distribution (Mw/Mn) of a blend of the nylon 11 or nylon 12 and the nylon 6/66 copolymer in the thermoplastic elastomer composition is Mw/Mn<10.0, preferably Mw/Mn<5.0, and in that a cross-linking agent for cross-linking the elastomer component is previously mixed into the elastomer component in advance.

In accordance with the present invention, there is provided a pneumatic tire having the above thermoplastic elastomer composition as an air permeation preventive layer.

In accordance with the present invention, there is further provided a process for producing a thermoplastic elastomer composition comprising the steps of mixing a rubber composition (A) and a thermoplastic resin (B) under conditions of the following equations (I) and (II):

$$(\phi_A/\phi_B) \times (\eta_B/\eta_A) < 1.0 \quad (I)$$

$$0.8 < (\eta_A/\eta_B) < 1.2 \quad (II)$$

wherein $\phi_A$: volume fraction of rubber composition (A), $\phi_B$: volume fraction of resin (B), $\eta_A$: melt viscosity of rubber composition (A), $\eta_B$: melt viscosity of resin (B)); and mixing the resultant composition (C) and a rubber composition (D) under conditions of the following formulas (III) and (IV):

$$(\phi_D/\phi_C) \times (\eta_C/\eta_D) < 1.0 \quad (III)$$

$$0.8 < (\eta_C/\eta_D) < 1.2 \quad (IV)$$

wherein $\phi_D$: volume fraction of rubber composition (D), $\phi_C$: volume fraction of composition (C), $\eta_D$: melt viscosity of rubber composition (D), $\eta_C$: melt viscosity of composition (C).

In accordance with the present invention, there is provided a pneumatic tire using a thermoplastic elastomer composition prepared by the above process of production for an air permeation preventive layer of the tire.

In accordance with the present invention, there is further provided a thermoplastic elastomer composition comprising an elastomer composition (A'), as a dispersion phase, and a thermoplastic resin composition (B'), as a matrix and having said thermoplastic resin composition composed of a blend of at least two thermoplastic resins, wherein the dispersed particle size of the elastomer composition (A') is not more than 10 µm and the particle size of a resin composition (D') dispersed in a matrix resin composition (C') in the thermoplastic resin composition (B') is smaller than the particle size of the dispersed rubber.

In accordance with the present invention, there is further provided a thermoplastic elastomer composition, wherein the elastomer composition (A') and the thermoplastic resin composition (B') satisfy the following equations (V) and (VI):

$$(\phi_d/\phi_m) \times (\eta_m/\eta_d) < 1.0 \quad (V)$$

$$0.8 < (\eta_m/\eta_d) < 1.2 \quad (VI)$$

wherein $\phi_d$: volume fraction of elastomer composition (A'), $\phi_m$: volume fraction of thermoplastic resin composition (B'), $\eta_d$: melt viscosity of elastomer composition (A'), $\eta_m$: melt viscosity of thermoplastic resin composition (B') and the matrix resin composition (C') and dispersed resin composition (D') in the thermoplastic resin composition (B') satisfy the following equations (VII) and (VIII):

$$(\phi_{D'}/\phi_{C'}) \times (\eta_{C'}/\eta_{D'}) < 1.0 \quad (VII)$$

$$0.8 < (\eta_{C'}/\eta_{D'}) < 1.2 \quad (VIII)$$

wherein $\phi_{D'}$: volume fraction of dispersed resin composition (D'), $\phi_{C'}$: volume fraction of matrix resin composition (C'), $\eta_{D'}$: melt viscosity of dispersed resin composition (D'), $\eta_{C'}$: melt viscosity of matrix resin composition (C').

Further, in accordance with the present invention, there is a provided a thermoplastic elastomer composition characterized in that a blend of at least two polyamide resins is selected as the thermoplastic resin composition (B') and in that a polyamide resin having at least seven methylene groups with respect to one amide group is contained as the matrix resin composition (C') in the thermoplastic resin composition (B') and a polyamide resin having less than seven methylene groups with respect to one amide group is contained as the dispersed resin composition (D').

Further, in accordance with the present invention, there is provided a pneumatic tire and hose using the thermoplastic elastomer composition obtained according to the present invention.

BRIEF DESCRIPTION OF THE DRAWINGS

The present invention will be explained in further detail below with reference to the drawings, wherein.

BEST MODE FOR CARRYING OUT THE INVENTION

The thermoplastic elastomer composition according to a first aspect of the present invention includes a composition obtained by blending into a nylon resin having a melting point of 170 to 230° C. an elastomer including a halide of isobutylene-p-methylstyrene copolymer (X-IPMS) and dynamically vulcanizing it to a gelation rate of 50 to 95%. The thermoplastic elastomer composition according to the present invention must be composed of the thermoplastic resin component of the nylon resin forming a continuous phase and an elastomer component including the X-IPMS uniformly blended therein as a dispersion phase. Further, the present invention is characterized by the elastomer component being present with a gelation rate of 50 to 95%, whereby the heat resistance and the durability—weak points in this type of thermoplastic elastomer composition in the past—are improved.

Here, the gelation rate is obtained by extracting a sample a day and night by a Soxhlet apparatus by a solvent for rubber (in this case, acetone and n-hexane), weighing the dried residue, and applying suitable correction based on knowledge regarding the composition so as to determine the amount of the insoluble polymer. That is, the corrected initial and final weights are obtained by subtracting from the first weights the soluble components other than rubber and the organic solvent-soluble resin component. All insoluble pigments, fillers, etc. are subtracted from the initial and final weights.

When the gelation rate is less than 50%, even if the rubber and resin are mixed together in a high shear state, the rubber once dispersed joins together again, it is not possible to disperse and fix the rubber finely (particle size of several microns) in the resin, and the film properties deteriorate. Further, when the gelation rate exceeds 95%, when the thermoplastic elastomer composition is subjected to a dynamic durability test, the Young's modulus of the elastomer component becomes too large, and therefore, the composition is destroyed starting at the elastomer. In view of this, it is preferable that the gelation rate is 50 to 95%.

In the thermoplastic elastomer composition according to the present invention, a nylon resin having a melting point of 170 to 230° C. is selected for use as the thermoplastic resin component and a rubber component containing X-IPMS is selected for use as the elastomer component. The nylon resin having the melting point of 170 to 230° C. usable in the present invention includes nylon 6 (N6), nylon 11 (N11), nylon 12 (N12), a nylon 6/66 copolymer (N6/66), nylon 610 (N610), and nylon 612 (N612). Further, the rubber component usable together with the X-IPMS of the elastomer component, includes diene rubbers and the hydrates thereof (for example NR, IR, epoxylated natural rubber, SBR, BR (high cis BR and low cis BR), NBR, hydrogenated NBR, hydrogenated SBR), olefin rubbers (for example, ethylene propylene rubbers (EPDM, EPM), maleic acid-modified ethylene propylene rubbers (M-EPM), IIR, isobutylene and aromatic vinyl or diene monomer copolymers, acrylic rubbers (ACM), ionomers), halogen-containing rubbers (for example, Br-IIR, Cl-IIR, bromide of isobutylene-p-methylstyrene copolymer) (Br-IPMS), chloroprene rubbers (CR), hydrin rubbers (CHR), chlorosulfonated polyethylenes (CSM), chlorinated polyethylenes (CM), maleic acid-modified chlorinated polyethylenes (M-CM)), silicone rubbers (for example, methylvinyl silicone rubbers, dimethyl silicone rubbers, methylphenylvinyl silicone rubbers), sulfur-containing rubbers (for example, polysulfide rubbers), fluoro rubbers (for example, vinylidene fluoride rubbers, fluorine-containing vinyl ether-based rubbers, tetrafluoroethylene-propylene rubbers, fluorine-containing silicone rubbers, fluorine-containing phosphagen rubbers), thermoplastic elastomers (for example, styrene elastomers, olefin elastomers, ester elastomers, urethane elastomers, or polyamide elastomers), etc. may be mentioned.

In the thermoplastic elastomer composition of the present invention, the nylon resin having the above range of melting points was selected as the thermoplastic resin component because, when those having a melting point less than 170° C. are used, the thermoplastic elastomer composition melts at the time of vulcanization of the tire, sticks to the bladder, and causes the appearance of the tire inside surface to deteriorate, while when those having a melting point of over 230° C. are used, the Young's modulus of the thermoplastic elastomer becomes large and the durability of the thermoplastic elastomer composition falls during tire use. Further, as the rubber component capable of being contained in the X-IPMS of the elastomer component, preferably an ethylenically unsaturated nitrile-conjugated diene-based high saturation copolymer rubbers (HNBR), epoxylated natural rubbers (ENR), NBR, hydrin rubbers, acryl rubbers, etc. may be mentioned, but these are used for the purpose of improving the compatibility of the nylon and X-IPMS which are largely different in solubilities. In this elastomer component, the X-IPMS serving as the main ingredient is required to be blended in an amount at least 30% by weight of the total amount of the rubber component in order to improve the air permeation preventive property and heat resistance of the thermoplastic elastomer composition. The remainder may be made the above rubber component jointly used.

The elastomer component including the X-IPMS may be blended into the above specific nylon resin in the thermoplastic elastomer composition of the present invention in a ratio by weight in the range of 30/70 to 70/30, preferably in the range of 35/65 to 50/50.

According to a preferred embodiment of the present invention, the thermoplastic elastomer composition may be formulated using a thermoplastic resin component where the nylon resin component is composed of nylon 11 (N11) or nylon 12 (N12) and nylon 6/66 copolymer (N6/N66) in a ratio of composition (ratio by weight) of 10/90 to 90/10, preferably 30/70 to 85/15. This thermoplastic elastomer composition is particularly preferable in the point of providing a thermoplastic elastomer superior in durability and superior in the tire inside appearance and air permeation preventive property and, further, having a good balance of these properties.

Further, a thermoplastic elastomer composition where the molecular weight distribution (Mw/Mn) of the blend of the N11 or N12 and N6/66 in the thermoplastic elastomer composition is Mw/Mn<10.0, preferably Mw/Mn<5.0, more preferably Mw/Mn<3.0, in terms of the molecular weight distribution according to extraction and measurement of the resin after twin-screw mixing gives the thermoplastic elastomer composition of the present invention superior in fatigue endurance, in addition to the above properties.

Cutting of the molecule occurs in the resin component (N11 or N12 and N6/66 blend) in the thermoplastic elastomer composition due to the high temperature, high shear conditions at the time of twin-screw mixing and the components used for the cross-linking agent of the elastomer component (for example, amine vulcanization accelerator, metal halide produced from a metal oxide and halide). If the molecule is cut, the molecular weight distribution of the resin component tends to become larger. If this exceeds 10, it was found that the durability in particular decreases.

The elastomer component compounded into the thermoplastic elastomer composition according to the present invention may had added thereto the compounding agents generally blended into elastomers for improving the dispersion and heat resistance of the elastomer and the like, such as a reinforcing agent, filler, cross-linking agent, softening agent, antioxidant, and processing aid. Among these, in the thermoplastic elastomer composition of the present invention, the necessary amount of cross-linking agent is added into the elastomer component, but in order so achieve a gelation rate of 50 to 95% of the elastomer required in the present invention, it is effective to adopt the method of previously mixing the cross-linking agent capable of cross-linking the elastomer into the elastomer component. By this method, compared with the method as in the past of melt mixing the thermoplastic resin component and the elastomer component, then adding the cross-linking agent, the cross-linking agent does not partially react with the thermoplastic resin and give much action of cutting of molecule etc. to the resin and, further, control of the gelation rate of the elastomer component is easy. As a result, there is little deterioration of the thermoplastic resin, vulcanization of 50 to 95% of the elastomer component is achieved, and the durability of the thermoplastic elastomer composition of the present invention can be enhanced.

The process for producing of the thermoplastic elastomer composition of the present invention can be performed by the following procedure.

First, a general kneader, Bambury mixer, etc. is previously used to mix the elastomer component and predetermined cross-linking agent until a uniform mixed state is obtained. At this time, the elastomer component may have added thereto suitable amounts of fillers such as carbon, oil, and also calcium carbonate. Further, during the mixing, if the temperature of the material is too high, the rubber component would cause a cross-linking reaction in the kneader or mixer, and therefore, the temperature has to be suppressed to a low temperature of not more than 120° C. during the mixing.

The cross-linking agent-containing elastomer component thus prepared and predetermined nylon resin are charged into a twin-screw mixing extruder etc. The rubber component is made to dynamically cross-link, while performing the melt mixing to cause the elastomer component to disperse as a dispersion phase (domain) in the nylon resin forming the continuous phase (matrix phase).

Further, various compounding agents (except the vulcanization agents) may be added to the nylon resin or elastomer component during the above mixing, but it is preferable to mix them in advance before the mixing. The mixer used for the mixing of the nylon resin and elastomer component is not particularly limited, but a screw extruder, kneader, Bambury mixer, twin-screw mixing extruder, etc. may be used. Among these, a twin-screw mixing extruder is preferably used for mixing of the nylon resin and elastomer component and dynamic vulcanization of the elastomer component. Further, two or more types of mixers may be used for successive mixing. As the conditions for the melt mixing, the temperature should be at least the temperature at which the predetermined nylon resin melts. Further, the shear rate at the time of mixing is preferably 500 to 7500 sec$^{-1}$. The overall time of the mixing is preferably from 30 seconds to 10 minutes.

The thermoplastic elastomer composition thus obtained is structured with the elastomer component forming a discontinuous phase dispersed as a dispersion phase (domain) in a matrix of the nylon resin forming the continuous phase. By adopting such a state of dispersion structure, thermoplastic processing becomes possible and the same shaping processability as with a nylon resin can be obtained at the time of shaping, and therefore, a film can be formed by an ordinary molding machine for resin, that is, by extrusion or calendaring.

As the vulcanization agent previously blended into the elastomer component, a general rubber vulcanization agent (i.e., cross-linking agent) may be used. Specifically, as a sulfur vulcanization agent, powdered sulfur, precipitated sulfur, high dispersion sulfur, surface-treated sulfur, insoluble sulfur, dimorpholinedisulfide, alkylphenoldisulfide, etc. may be mentioned. For example, they may be used in an amount of about 0.5 to 4 phr (parts by weight per 100 parts by weight of the elastomer component (polymer)).

Further, as an organic peroxide vulcanization agent, benzoylperoxide, t-butylhydroperoxide, 2,4-dichlorobenzoylperoxide, 2,5-dimethyl-2,5-di(t-butylperoxy)hexane, 2,5-dimethylhexane-2,5-di (peroxylbenzoate), etc. may be mentioned. For example, 1 to 20 phr or so may be used.

Further, as a phenol resin vulcanization agent, a bromide of an alkylphenol resin or a mixed cross-linking agent system containing stannous chloride, chloroprene, or other halogen donor and an alkylphenol resin may be mentioned. For example, 1 to 20 phr or so may be used.

In addition, zinc oxide (5 phr or so), magnesium oxide (4 phr or so), lyserge (10 to 20 phr or so), p-quinonedioxime, p-dibenzoylquinonedioxime, tetrachloro-p-benzoquinone, poly-p-dinitrosobenzene (2 to 10 phr or so), and methylenedianiline (0.2 to 10 phr or so) may be exemplified.

Further, if necessary, a vulcanization accelerator may be added to the vulcanization agent. As the vulcanization accelerator, general vulcanization accelerator such as an aldehyde-ammonia, guanidine, thiazole, sulfenamide, thiuram, dithio acid salt, thiurea, may be added, for example, in an amount of 0.5 to 2 phr or so.

The thermoplastic elastomer composition according to the present invention is superior in heat resistance and durability as well, while being superior in flexibility, is free from sticking to the bladder for vulcanization use and is low in air permeability, and therefore, superior in air permeation preventive property as well, and therefore, can be effectively used for the air barrier layer in a tire.

In the second aspect of the present invention, the fact was found that, in the production of a thermoplastic elastomer composition structured with a thermoplastic resin component as a continuous phase (matrix) and a rubber component as a dispersion phase (domain), if the components are mixed and vulcanized by a two-stage mixing process with the ratio of the melt viscosities of the components at the individual mixing stages and the volume fractions×ratio of melt viscosities kept under certain conditions, it is possible to maintain the dispersion structure even in a range where the ratio of compounded rubber exceeds 50% by weight and the rubber dispersed particle size of the domain becomes extremely small, whereby a thermoplastic elastomer composition which is flexible, large in strength and elongation as well, and superior in durability as well is obtained.

Further, in the present invention, in the production of the thermoplastic elastomer composition, in the first stage of the mixing process, the rubber composition (A) and resin (B) are selected such that the ratio of the melt viscosities of the rubber composition (A)/resin (B) becomes 0.8 to 1.2 and the equation $(\phi_A/\phi_B) \times (\eta_B/\eta_A) < 1.0$ wherein $\phi_A$: volume fraction of rubber composition (A), $\phi_B$: volume fraction of resin (B), $\eta_A$: melt viscosity of rubber composition (A), $\eta_B$: melt viscosity of resin (B) are mixed to first produce the composition (C), then suitably thereafter a second stage of the mixing process is performed to mix a rubber composition (D) and the above obtained composition (C) so that the ratio of the melt viscosities of the rubber composition (D)/ composition (C) becomes 0.8 to 1.2 and the equation $(\phi_D/\phi_C) \times (\eta_C/\eta_D) < 1.0$ wherein $\phi_D$: volume fraction of rubber composition (D), $\phi_C$: volume fraction of composition (C), $\eta_D$: melt viscosity of rubber composition (D), $\eta_C$: melt viscosity of composition (C), whereby a thermoplastic elastomer composition which is flexible, high in strength, high in elongation, and superior in durability can be obtained The rubber composition (A) usable in the production of the thermoplastic elastomer composition of the present invention may be made a rubber composition composed of a rubber component into which ordinary rubber formulation components including vulcanization system components are blended or may be made a rubber composition comprising a rubber component into which the ordinary rubber formulation components other than the vulcanization ingredients are blended. As the rubber component, diene rubbers such as natural rubbers, synthetic polyisoprene rubbers (IR), epoxylated natural rubbers, styrene-butadiene rubbers (SBR), polybutadiene rubbers (BR), nitrile-butadiene rubbers (NBR), hydrogenated NBR, and hydrogenated SBR and their hydrogenates; olefin rubbers such as ethylene propylene rubber (EPDM, EPM), a maleic acid-modified ethylene propylene rubber (M-EPM), butyl rubber (IIR), an isobutylene and aromatic vinyl or diene-based monomer copolymer, an acrylic rubber (ACM), ionomer, a halogen-containing rubber (Br-IIR, Cl-IIR, a bromide of an isobutylene-p-methylstyrene copolymer (Br-IPMS), chloroprene rubber (CR), a hydrin rubber (CHC, CHR), chlorosulfonated polyethylene (CSM), chlorinated polyethylene (CM), and maleic acid-modified chlorinated polyethylene (M-CM)); a silicone rubber such as a methylvinyl silicone rubber, dimethyl silicone rubber, or methylphenylvinyl silicone rubber; a sulfur-containing rubber such as a polysulfide rubber; a fluororubber such as a vinylidene fluoride rubber, fluorine-containing vinyl ether rubber, tetrafluoroethylene-propylene rubber, fluorine-containing silicone rubber, or fluorine-containing phosphagen rubber; a thermoplastic elastomer such as a styrene elastomer, olefin elastomer, polyester elastomer, urethane elastomer, or polyamide elastomer, etc. may be mentioned.

When using a rubber composition comprising a rubber ingredient not including the vulcanization formulation components, it is preferable to blend in the vulcanization system after the first stage of the mixing process.

As the resin (B) usable for the production of the thermoplastic elastomer composition of the present invention, a thermoplastic resin is used. As the resin ingredient, an olefin resin (for example, homopolypropylene, block polypropylene, random polypropylene, high molecular weight polyethylene, low molecular weight polyethylene, α-olefin-ethylene copolymer), polyamide-based resin (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer), a polyester-based resin (for example, polybutylene terephthalate (PBT), polyethylene terephthalate (PET), polyethylene isophthalate (PEI), PET/PEI copolymer, polyacrylate (PAR), polybutylenenaphthalate (PBN), liquid crystal polyester, polyoxyalkylenediimidate/ polybutyrate terephthalate copolymer, and other aromatic polyesters), a polynitrile-based resin (for example, polyacrylonitrile (PAN), polymethacrylonitrile, acrylonitrile/styrene copolymer (AS), methacrylonitrile/styrene copolymer, methacrylonitrile/styrene/butadiene copolymer), a polymethacrylate-based resin (for example, polymethyl methacrylate (PMMA) and polyethyl methacrylate), a polyvinyl-based resin (for example, vinyl acetate (EVA), polyvinylalcohol (PVA), vinylalcohol/ethylene copolymer (EVOH), polyvinylidene chloride (PVDC), polyvinyl chloride (PVC), vinyl chloride/vinylidene chloride copolymer, and vinylidene chloride/methylacrylate copolymer), a cellulose resin (for example, cellulose acetate, cellulose acetate butyrate), a fluororesin (for example, polyvinylidene fluoride (PVDF), polyvinyl fluoride (PVF), polychlorofluoroethylene (PCTFE), and tetrachloroethylene/ethylene copolymer (ETFE)), an imide resin (for example, aromatic polyimide (PI)), etc. may be mentioned.

As the rubber composition (D) usable for the production of the thermoplastic elastomer composition of the present invention, it is possible to use a rubber composition obtained by blending, into the rubber component ordinary rubber, compounding agents including the vulcanization system formulation components or a rubber composition obtained by blending into the rubber component ordinary rubber compounding agents excluding the vulcanization system formulation components. When not including the vulcanization system formulation components in the rubber component, the vulcanization system formulation components are blended after the second stage of the mixing process. Further, the various thermoplastic elastomers listed above are used for the rubber component mixed with the rubber composition (D)

As the vulcanization agent used for the rubber component, a general rubber vulcanization agent (cross-linking agent) may be used. Specifically, as a sulfur vulcanization agent, powdered sulfur, precipitated sulfur, high dispersion sulfur, surface-treated sulfur, insoluble sulfur, dimorpholinedisulfide, alkylphenoldisulfide, etc. may be mentioned. For example, they may be used in amounts of about 0.5 to 4 phr (parts by weight per 100 parts by weight of the rubber component (polymer).

Further, as an organic peroxide vulcanization agent, benzoylperoxide, t-butylhydroperoxide, 2,4-dichlorobenzoylperoxide, 2,5-dimethyl-2,5-di(t-butylperoxy)hexane, 2,5-dimethylhexane-2,5-di (peroxylbenzoate), etc. may be mentioned. For example, 1 to 20 phr or so may be used.

Further, as a phenol resin vulcanization agent, a bromide of an alkylphenol resin or a mixed cross-linking agent containing such as stannous chloride, chloroprene, halogen donor and an alkylphenol resin may be mentioned. For example 1 to 20 phr or so may be used.

In addition, zinc oxide (about 5 phr), magnesium oxide (4 phr or so), lyserge (about 10 to 20 phr), p-quinonedioxime, p-dibenzoylquinonedioxime, tetrachloro-p-benzoquinone, poly-p-dinitrosobenzene (about 2 to 10 phr or so), and methylenedianiline (0.2 to 10 phr) may be exemplified.

Further, if necessary, a vulcanization accelerator may be added to the vulcanization agent. As the vulcanization accelerator, general vulcanization accelerators such as an aldehyde-ammonia, guanidine, thiazole, sulfenamide, thiuram, dithio acid salt, thiurea may be added for example in about 0.5 to 2 phr.

The process for producing the thermoplastic elastomer composition of the present invention can be performed, for example, by the following procedure.

First, a general kneader, Bambury mixer, etc. is previously used to mix the predetermined rubber component and predetermined cross-linking agent until a uniform mixed state is obtained so as to prepare the rubber compositions (A) and (D). At this time, the rubber compositions may have added to them suitable amounts of fillers such as carbon, oil, and also calcium carbonate.

The rubber composition (A) thus prepared and predetermined resin (B) are charged into a twin-screw mixing extruder etc. used for the first mixing process for the melt mixing. In the case of use of a rubber composition composed of the rubber composition (A), without the vulcanization compounding agents, the vulcanization compounding agents are added at the stage where mixing has been sufficiently performed, then further mixing is continued to cause the rubber composition to dynamically cross-link to give a composition (C) of a structure with the rubber composition dispersed as a dispersion phase (domain) in the resin forming the continuous phase (matrix). Suitably, thereafter, the composition (C) is taken out, then is led to a twin-screw mixing extruder used for the second kneading process, where the rubber composition (D) is added and mixing performed. When using a rubber composition comprising the rubber composition (D), without the vulcanization compounding agents, the vulcanization compounding agents are added at the stage when the mixing has been sufficiently performed, then the mixing is continued to dynamically cross-link the rubber composition. By performing this two-stage mixing operation in this way, a thermoplastic elastomer composition having a domain of extremely small rubber particles dispersed in a resin matrix in a state having a high rubber ratio is obtained.

Further, in the production of the above thermoplastic elastomer composition, two twin-screw mixing extruders were used, but it is also possible to obtain the desired thermoplastic elastomer composition by the method of using a single twin-screw mixing extruder. In this case, the rubber composition (A) and resin (B) are added and mixed in the front of the twin-screw mixing extruder, then the vulcanization system components are added and mixed, then the rubber composition (D) is added and mixed at the rear of the twin-screw mixing extruder, whereby a thermoplastic elastomer composition having the same type of dispersion structure as the above is obtained.

Further, the various compounding agents (except vulcanization formulation components) may be added to the thermoplastic resin or rubber composition during the above mixing, but they may also be previously mixed before the mixing. The mixer used for the mixing of the rubber composition (A) and resin (B) and further the mixing of the composition (C) of the mixed matter and the rubber composition (D) is not particularly limited. A screw extruder, kneader, Bambury mixer, twin-screw mixing extruder, etc. may be used. Among these, use of a twin-screw mixing extruder is preferable for mixing of the resin and rubber component and dynamic vulcanization of the rubber component. As the conditions for the melt mixing, the temperature should be at least the temperature at which the thermoplastic resin melts. Further, the shear rate at the time of mixing is preferably 500 to 7500 sec$^{-1}$. The overall time of the mixing is preferably from 30 seconds to 10 minutes.

The thermoplastic elastomer composition obtained in this way is structured with an extremely fine-particle-sized rubber component forming a discontinuous phase dispersed as a dispersion phase (domain) in a matrix of the thermoplastic resin forming the continuous phase. By adopting such a state of a dispersion structure, thermoplastic processing becomes possible and the same shapability as with a thermoplastic resin can be obtained at the time of molding, and therefore, a film can be formed by an ordinary resin-use molding machine, that is, by extrusion, calendaring, or injection molding.

When the solubilities of the thermoplastic resin and rubber composition differ, it is preferable to add as a third component a suitable compatibilizer. By mixing a compatibilizer into the system, the surface tension between the thermoplastic resin and the rubber composition is decreased and, as a result, the particle size of the rubber composition forming the dispersion phase will become finer, and therefore, the properties of the two components will be more effectively expressed. As such a compatibilizer, generally it is possible to use a copolymer having the structure or both or one of the thermoplastic resin and rubber polymer or a structure of a copolymer having an epoxy group, carbonyl group, halogen group, amine group, oxazoline group, hydroxy group, etc. capable of reacting with the thermoplastic resin or rubber polymer. These may be selected based upon the type of the thermoplastic resin polymer and rubber polymer to be mixed, but as those which are normally used, a styrene/ethylene-butylene block copolymer (SEBS) and its maleic acid-modified form, EPDM: EPDM/styrene, or EPDM/acrylonitrile graft copolymer and their maleic acid-modified forms, styrene/maleic acid copolymer, reactive phenoxy thermoplastic resin, etc. may be mentioned. The amount of the compatibilizer blended is not particularly limited, but preferably is 0.5 to 10 parts by weight, based upon 100 parts by weight of the polymer component (total of the thermoplastic resin polymer and rubber polymer).

Since the thermoplastic elastomer composition obtained by the production process of the present invention has the above dispersed structure, it is extremely flexible and high in strength and elongation and is superior in durability as well. Further, the film when formed into a film is extremely superior in air barrier property, and therefore, it is possible to effectively use the thin film as an inner liner layer of a pneumatic tire.

According to the third aspect of the present invention, it was found that by controlling the dispersed particles of the rubber elastomer to become smaller than a predetermined particle size and controlling the particle size of the dispersed resin particles in the matrix phase to become smaller than the particle size of the rubber elastomer dispersed particles in a thermoplastic elastomer composition having a structure of a blended resin as a matrix and a rubber elastomer. dispersed in it, it is possible to greatly improve the durability, in particular the compression set at low temperatures.

In a thermoplastic elastomer composition according to the present invention composed of the elastomer composition (A') as the dispersion phase and the thermoplastic resin composition (B') as the matrix and with the thermoplastic resin composition composed of a blend of at least two thermoplastic resins, the fact that the dispersed particle size of the elastomer composition (A') is not more than 10 $\mu$m, preferably not more than 5 $\mu$m, and the particle size of the resin composition (D') dispersed in the matrix resin composition (C') in the thermoplastic resin composition (B') is smaller than the dispersed rubber particle size are necessary not only for improving the durability at the time of heat and at the time of ordinary temperature, in particular, the durability when considering the state of use at stringent conditions at 10° C., 0° C., −20° C., or −40° C.

To achieve this phase structure of the present invention, first, the ratio of the volume fractions and the ratio of the melt viscosities of the elastomer composition (A') and the thermoplastic resin composition (B') are controlled so that the elastomer composition (A') and thermoplastic resin composition (B') satisfy the following equations (V) and (VI):

$$(\phi_d/\phi_m) \times (\eta_m/\eta_d) < 1.0 \tag{V}$$

$$0.8 < (\eta_m/\eta_d) < 1.2 \tag{VI}$$

wherein $\phi_d$: volume fraction of elastomer composition (A'), $\phi_m$: volume fraction of thermoplastic resin composition (B'), $\eta_d$: melt viscosity of elastomer composition (A'), $\eta_m$: melt viscosity of thermoplastic resin composition (B').

Second, the ratio of the volume fractions and the ratio of the melt viscosities of the matrix resin composition (C') and dispersed resin composition (D') in the thermoplastic resin composition (B') should be controlled so that the matrix resin composition (C') and dispersed resin composition (D') satisfy the following equations (VII) and (VIII):

$$(\phi_{D'}/\phi_{C'}) \times (\eta_{C'}/\eta_{D'}) < 1.0 \tag{VII}$$

$$0.8 < (\eta_{C'}/\eta_{D'}) < 1.2 \tag{VIII}$$

wherein $\phi_D$: volume fraction of dispersed resin composition (D'), $\phi_{C'}$: volume fraction of matrix resin composition (C'), $\eta_{D'}$: melt viscosity of dispersed resin composition (D'), $\eta_{C'}$: melt viscosity of matrix resin composition (C').

In the present invention, by controlling the composition so as to satisfy the above formulae (V) and (VI), the rubber elastomer component forms the dispersion phase and the thermoplastic resin component forms the continuous phase and the rubber elastomer dispersion phase becomes a microdispersion phase. Further, by controlling the composition so as to satisfy the above formulae (VII) and (VIII), a dispersed resin phase is formed in the matrix resin of the continuous phase and the resin dispersion phase becomes a microdispersion phase to give a thermoplastic elastomer composition remarkably improved in durability at low temperature.

The rubber elastomer composition (A') usable for the production of the thermoplastic elastomer composition of the present invention may be made a rubber elastomer composition composed of a rubber elastomer component in which is blended ordinary rubber compounding agents including the vulcanization formulation components or a rubber elastomer composition composed of the rubber elastomer component in which is blended ordinary rubber compounding agents not including the vulcanization formulation components. As the rubber elastomer component, one the same as the rubber component in the above second aspect may be used.

The vulcanization agent, vulcanization aid, vulcanization conditions (temperature, time), etc. when dynamically vulcanizing the rubber elastomer component constituting the dispersion phase of the thermoplastic elastomer composition of the present invention may be suitably determined depending upon the composition of the rubber elastomer component added and are not particularly limited.

As the vulcanization agent, a general rubber vulcanization agent (cross-linking agent) may be used. Specifically, as a sulfur vulcanization agent, powdered sulfur, precipitated sulfur, high dispersion sulfur, surface treated sulfur, insoluble sulfur, dimorpholinedisulfide, alkylphenoldisulfide, etc. may be mentioned. For example, they may be used in amounts of about 0.5 to 4 phr (parts by weight per 100 parts by weight of the elastomer component (polymer)).

Further, the organic peroxide vulcanization agent, phenol resin vulcanization agent, and other ingredients are the same as in the above second aspect. The amounts of formulation are also the same as explained above.

Further, in accordance with need, a vulcanization accelerator may be added. As the vulcanization accelerator, vulcanization accelerators such as an aldehyde-ammonia, guanidine, thiazole, sulfenamide, thiuram, dithio acid salt, thiurea may be added in an amount of, for example, 0.5 to 2 phr or so. Further, as the vulcanization acceleration aid, a general rubber aid may be used at the same time. For example, stearic acid or oleic acid and their Zn salts (2 to 4 phr or so) etc. may be used in the same way as in the above second aspect.

Further, the rubber elastomer forming the dispersion phase may, if necessary, have suitably blended into it, in addition to the above compounding agents, a softening agent, antioxidant, processing aid, or other compounding agent for improving the dispersion, heat resistance, etc.

Further, as the thermoplastic resin composition (B') usable for the production of the thermoplastic elastomer composition of the present invention, a blend of at least two thermoplastic resins is used. As the resin ingredient, a polyamide resin (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer), a polyester resin (for example, polybutylene terephthalate (PBT), polyethylene terephthalate (PET), polyethylene isophthalate (PEI), PET/PEI copolymer, polyacrylate (PAR), polybutylenenaphthalate (PBN), liquid crystal polyester, polyoxyalkylenediimidate/polybutyrateterephthalate copolymer, and other aromatic polyesters), a polynitrile resin (for example, polyacrylonitrile (PAN), polymethacrylonitrile, acrylonitrile/styrene copolymer (AS), methacrylonitrile/styrene copolymer, methacrylonitrile/styrene/butadiene copolymer), a polymethacrylate-based resin (for example, polymethyl methacrylate (PMMA) and polyethyl methacrylate), a polyvinyl resin (for example, vinyl acetate (EVA), polyvinylalcohol (PVA), vinylalcohol/ethylene copolymer (EVOH), polyvinylidene chloride (PVDC), polyvinyl chloride (PVC), vinyl chloride/vinylidene chloride copolymer, and vinylidene chloride/methylacrylate copolymer), a cellulose resin (for example, cellulose acetate, cellulose acetate butyrate), a fluororesin (for example, polyvinylidene fluoride (PVDF), polyvinyl fluoride (PVF), polychlorofluoroethylene (PCTFE), and tetrafluoroethylene/ethylene copolymer (ETFE)), an imide resin (for example, aromatic polyimide (PI)), etc. may be mentioned.

As the thermoplastic resin composition (B') of the present invention, a blend of at least two polyamide-based resins mentioned above is used. Further, among these, a polyamide resin having at least seven methylene groups with respect to one amide group for the matrix resin composition (C') in the thermoplastic resin composition (B') and a polyamide resin having less than seven methylene groups with respect to one amide group for the dispersed resin composition (D') is more preferably used for improving the balance of the durability and the gas barrier property.

The definitions and numbers of methylene groups with respect to the amide groups in the above polyamide resins are explained with reference to Table A.

TABLE A (Number of Amide Groups vs. Methylene Groups)

| | | Pliability and durability | No. of methylene groups with respect to one amide group | Gas premeation preventive property |
|---|---|---|---|---|
| Nylon 6 | $-[NH(CH_2)_5CO]_n-$ | Small | 5 | Large |
| Nylon 66 | $-[NH(CH_2)_6NHCO(CH_2)_4CO]_n-$ | ↓ | 5 | ↓ |
| Nylon 610 | $-[NH(CH_2)_6NHCO(CH_2)_8CO]_n-$ | ↓ | 7 | ↓ |
| Nylon 11 | $-[NH(CH_2)_{10}CO]_n-$ | Large | 10 | Small |

The thermoplastic resin comprising the matrix of the above thermoplastic elastomer composition may had added thereto the compounding agents generally blended for improving the processability, dispersion, heat resistance, anti-oxidation, etc., such as a plasticizer, softening agent, filler, reinforcing agent, processing aid, stabilizer, and antioxidant.

The production process of the thermoplastic elastomer composition of the present invention comprising the matrix resin in which the elastomer and synthetic resin are finely dispersed is as follows. First, a general kneader, Bambury mixer, etc. is used to previously mix the elastomer component and compounding agent component until a uniform mixed state is obtained so as to prepare the elastomer composition (A'). At this time, the elastomer component may have added thereto suitable amounts of carbon black, oil, and also calcium carbonate and other fillers. Further, if necessary, an elastomer vulcanization agent or cross-linking agent, vulcanization aid, vulcanization accelerator, etc. may be added.

The elastomer component thus prepared and matrix resin composition (C') and dispersed resin composition (D') are charged into a twin-screw mixing extruder etc. for melt mixing. When using an elastomer composition composed of the elastomer composition (A') not including the vulcanization compounding agents, the vulcanization compounding agents are added at the stage when the mixing is sufficiently performed and then further mixing is performed to cause the elastomer composition to dynamically cross-link so as to obtain the desired thermoplastic elastomer composition.

Further, the various compounding agents may be mixed previously in the thermoplastic resin or elastomer composition before the above twin-screw mixing, but it is also possible to add them during the above twin-screw mixing. As the conditions for the mixing of the elastomer composition (A'), matrix resin composition (C'), and dispersed resin composition (D') and the melt mixing for the dynamic vulcanization of the elastomer composition, the temperature should be at least the temperature at which the thermoplastic resin melts. Further, the shear rate at the time of mixing is preferably 500 to 7500 $sec^{-1}$. The mixing time is preferably from 30 seconds to 10 minutes.

By molding the thermoplastic elastomer composition obtained into a sheet, film, or tube using a T-sheeting die, straight or crosshead structure tubing die, inflation molding cylindrical die, etc. at the end of the single-screw extruder, it is possible to use as the air permeation preventive layer of the pneumatic tire and the rubber/resin laminate of a hose etc. Note that the thermoplastic elastomer composition obtained may be taken up into strands once, pelletized, then molded by the above single-screw extruder for resin.

The sheet or tubular molded article thus obtained is composed of a thermoplastic elastomer composition controlling the morphology of the three-way blended rubber elastomer/matrix resin/dispersion phase resin of the present invention having a phase structure of vulcanized rubber finely dispersed in a matrix resin and dispersion phase resin finer than the rubber particles dispersed uniformly, and therefore, a thin film has the property of a high durability at low temperatures. By making the resin finely dispersed in the matrix resin one superior in gas permeation preventive property, it is possible to give durability at a low temperature and give superior gas barrier property, and therefore, this can be effectively used for the air permeation preventive layer of a pneumatic tire or the hose tube or hose cover of a low gas permeable hose.

EXAMPLES

The present invention will be explained in further detail below with reference to the Examples, but the present invention is of course not limited in scope to these Examples.

Examples I-1 to I-6 and Comparative Examples I-1 to I-5

The following commercially available products were used for the components used in the Examples.
1) Resin Component
  N11 (nylon 11): Rilsan BMN O (made by Atochem)
  N6/66[1] (nylon 6/66 copolymer): Amilan CM6001 (made by Toray)
  N6/66[2] (nylon 6/66 copolymer): Amilan CM6041 (made by Toray)
  N66 (nylon 66): Amilan CM3001N (made by Toray)
  PP (polypropylene): RV421 (made by Tokuyama)
  MAH-g-EEA (maleic acid-modified ethylene ethyl acrylate):A1600 (made by Nippon Petrochemicals)
2) Rubber (Elastomer) Component
  Br-IPMS: EXXPRO 89-4 (made by Exxon Chemical)
  HNBR: Zetpol 1020 (made by Nippon Zeon)
  ENR: 50% epoxidized natural rubber (made by Malaysia)
3) Vulcanization System Components
  Zinc oxide: Zinc White No. 3 (made by Seido Chemical)
  Zinc stearate: (made by Seido Chemical)
  Stearic acid: Beads Stearate NY (made by NOF Corporation)
  Sulfur: Powdered sulfur (made by Karuizawa Refinery)
  TT: Noccelar TT (made by Ouchi Shinko Chemical)
  M: Noccelar M (made by Ouchi Shinko Chemical)
  Production of Thermoplastic Elastomer Composition In each of Examples I-1 to I-5 and Comparative Examples I-1 and I-3 to I-5, the predetermined elastomer component and vulcanization system were charged into a Bambury mixer in the formulation shown in Table I-1, mixed for approximately 2 minutes, and dump out at 120° C. to prepare an elastomer component with a vulcanization system. This was then pelletized by a rubber pelletizer. Next, the elastomer component and resin were dry blended in a predetermined formulation, charged into a twin-screw mixing extruder, and dynamically vulcanized to prepare a thermoplastic elastomer composition. The mixing conditions at this time were a temperature of 230° C. (270° C. in Comparative Example I-4) and a shear rate of 1000 s$^{-1}$.

In Example I-6, the elastomer component and resin were melted to dispersed with each other, then the vulcanization system was added.

The thermoplastic elastomer composition prepared by the twin-screw mixing extruder was water-cooled, then pelletized, then passed through a T-die by a single-screw extruder to form it into a film of a width of 350 mm and thickness of 100 $\mu$m.

The test methods and evaluation methods used in the following examples were as follows:

1) Test Method of Young's Modulus of Film

This was based on JIS K6251 "Tensile Test Method of vulcanized Rubber".

Test piece: Film samples prepared in the Examples were punched out into JIS No. 3 dumbbell shapes in parallel to the direction of extrusion at the time of extrusion of the film.

A tangent was drawn to the curve of the initial strain region of the obtained stress-strain curve and the Young's modulus found from the inclination of the tangent.

2) Test Method of Film Air Permeation Coefficient

Based on JIS K7126 "Air Permeation Test Method of Plastic Film and Sheets (Method A)".

Test pieces: Film samples prepared in Examples were used.

Test gas: Air ($N_2:O_2=8:2$)

Test temperature: 30° C.

3) Test Method of 40% Constant Strain Durability

Rubber-based cement of the formulation shown below was brushed on a thermoplastic elastomer composition film and dried. The film was then superposed on tire carcass use rubber (no carcass) of the formulation shown below, then the assembly was vulcanized at 180° C. for 10 minutes to prepare a 2 mm thick film/rubber laminate. This was punched out to a JIS No. 2 dumbbell shape which was used for a durability test at a cycle of 5 Hz while applying 40% constant strain. (Note: the test was stopped for samples not breaking after 5,000,000 times.)

| (Formulation of Rubber-Based Cement) | |
|---|---|
| Component | Parts by weight |
| Natural rubber (RSS#3) | 80 |
| SBR (Nipol 1502, Nippon Zeon) | 20 |
| FEF carbon black (HTC#100, Chubu Carbon) | 50 |
| Stearic acid (Beads Stearic Acid NY, NOF Corporation) | 2 |
| ZnO (No. 3 Zinc White) | 3 |
| Sulfur (Powdered Sulfur, Karuizawa Refinery) | 3 |
| Vulcanization accelerator (BBS, N-t-butyl-2-benzothiazyl sulfenamide) | 1 |
| Aromatic oil (Desorex No. 3, Showa Shell Oil) | 2 |
| Hexamethoxymethylated melamine (CYREZ-964RPC, Mitsui Cytec) | 5 |
| Resorcin-formaldehyde resin (Penacolite Resin B-18-S, Indospec Chemical) | 10 |
| Phenol-formaldehyde resin (Hitanol 1502Z, Hitachi Kasei Kogyo) | 1 |
| Toluene | 1000 |

(Tire Use Carcass Rubber Formulation)

| Component | Parts by weight |
|---|---|
| Natural rubber (RSS#3) | 80 |
| SBR (Nipol 1502, Nippon Zeon) | 20 |
| FEF carbon black (HTC#100, Chubu Carbon) | 50 |
| Stearic acid (Beads Stearic Acid NY, NOF Corporation) | 2 |
| ZnO (No. 3 Zinc White) | 3 |
| Sulfur (Powdered Sulfur, Karuizawa Refinery) | 3 |
| Vulcanization accelerator (BBS, N-t-butyl-2-benzothiazyl sulfenamide) | 1 |
| Aromatic oil (Desorex No. 3, Showa Shell Oil) | 2 |

4) Measurement of Gelation Rate

The thermoplastic elastomer composition pelletized after the twin-screw mixing was extracted by a Soxhlet apparatus in a water bath for 8 hours by acetone. The residue was extracted to a Soxhlet apparatus for 8 hours by n-hexane. Due to the operation, the unvulcanized elastomer component was extracted with a solvent. The acetone and n-hexane extracts were dried of their solvents and measured for weight, then the gelation rate was determined by the following equation. (Note: the stearic acid was subtracted since it was extracted with the solvent.)

Gelation rate=[[Total amount of elastomer−{(amount of acetone extracted+amount of n-hexane extracted)−amount of stearic acid}]/(total amount of elastomer)]×100

5) Measurement of Molecular Weight Distribution (Mw/Mn)

The above n-hexane extraction residue was extracted by a Soxhlet apparatus with hexafluoroisopropanol (hereinafter referred to as "HFIP") for 8 hours. The thermoplastic resin (nylon) was dissolved and extracted by this operation. The extract was acetylated by anhydrous trifluoroacetic acid and measured for molecular weight by GPC. The molecular weight distribution (Mw/Mn) was found from a comparison of the weight average molecular weight and number average molecular weight using the data obtained.

6) Formation of Tire

A rubber-based cement of the formulation shown in the test method of the 40% constant strain durability test of the above 3) was coated on a thermoplastic elastomer film of a width of 350 mm, the film was wrapped over a tire shaping drum, then tire members such as a carcass, side belt, tread were superposed and the assembly inflated to obtain a green tire. The green tire was vulcanized by a vulcanizer at 180° C. for 10 minutes to produce a finished tire of a tire size 165SR13.

7) Tire Inside Appearance

With compositions with low heat resistance, after tire vulcanization, the film partially sticks to the vulcanization bladder or the surface layer breaks and becomes rough. These are rated as failing ("poor"). Further, compositions where there is no effect on tire performance, but where the product value is lowered are rated as "fair". Compositions without such abnormalities are rated as passing ("good").

8) Test Method of Tire Air Leakage Performance

A 165SR13 steel radial tire (rim 13×4½-J) was used and allowed to stand at an initial pressure of 220 kPa and no-load conditions at room temperature of 21° C. for three months and then measured for pressure at measurement intervals of every four days.

The value α was found by recurrence to the function $$P_t/P_0 = \exp(-\alpha t)$$

where the test pressure is $P_t$, the initial pressure is $P_0$ and the elapsed days is t. The α obtained was used and t=30 substituted into the following formula to obtain the value β:

$$\beta = [1 - \exp(-\alpha t)] \times 100$$

This value β was used as the rate of pressure loss (%/month) per month.

9) Test Method of Tire Durability

A 165SR13 steel radial tire (rim 13×4½-J) was used and run on an actual road for 10,000 km at an air pressure of 140 kPa given a load of 5.5 kN.

After being run on, the tire was detached from the rim and the liner layer of the inside surface of the tire was examined visually. Tires with fissures, cracks, visible wrinkles, or peeling or rising of the liner layer in the inner layer were rated as failing ("poor"), while tires without them were rated as passing ("good"). Further, tires with peeling or rising of the liner, but no fissures or cracks in the liner layer were rated as ("fair").

The test results of the Examples are shown in Table I-1.

TABLE I-1

| | Ex. I-1 | Ex. I-2 | Ex. I-3 | Ex. I-4 | Ex. I-5 | Ex. I-6 | Comp. Ex. I-1 | Comp. Ex. I-2 | Comp. Ex. I-3 | Comp. Ex. I-4 | Comp. Ex. I-5 |
|---|---|---|---|---|---|---|---|---|---|---|---|
| <Resin> | | | | | | | | | | | |
| N11 | 8 | 16 | 32 | 24 | 24 | 24 | 24 | 24 | — | — | 24 |
| N6/66[1]) | 32 | 24 | 8 | 16 | 11 | 11 | 11 | 11 | — | — | 11 |
| N6/66[2]) | — | — | — | — | 5 | 5 | 5 | 5 | — | — | 5 |
| N66 | — | — | — | — | — | — | — | — | — | 40 | — |
| PP | — | — | — | — | — | — | — | — | 40 | — | — |
| MAH-g-EEA | — | — | — | — | — | — | — | — | — | — | — |
| <Rubber> | | | | | | | | | | | |
| Br-IPMS | 60 | 60 | 60 | 35 | 35 | 35 | 35 | 35 | 60 | 60 | 35 |
| HNBR | — | — | — | 10 | 10 | 10 | 10 | 10 | — | — | 10 |
| ENR | — | — | — | 5 | 5 | 5 | 5 | 5 | — | — | 5 |
| <Vulcanization system> | | | | | | | | | | | |
| Zinc oxide | 0.3 | 0.3 | 0.3 | 0.3 | 0.3 | 0.3 | — | — | 0.3 | 0.3 | 1.5 |
| Zinc stearate | 1.2 | 1.2 | 1.2 | 0.05 | 0.05 | 0.05 | — | — | 1.2 | 0.05 | 0.15 |
| Stearic acid | 0.6 | 0.6 | 0.6 | 0.12 | 0.12 | 0.12 | — | — | 0.6 | 0.12 | 0.6 |
| Sulfur | — | — | — | 0.05 | 0.05 | 0.05 | 0.05 | — | — | 0.05 | 0.15 |
| TT | — | — | — | 0.12 | 0.12 | 0.12 | 0.12 | — | — | 0.12 | 0.6 |

TABLE I-1-continued

|  | Ex. I-1 | Ex. I-2 | Ex. I-3 | Ex. I-4 | Ex. I-5 | Ex. I-6 | Comp. Ex. I-1 | Comp. Ex. I-2 | Comp. Ex. I-3 | Comp. Ex. I-4 | Comp. Ex. I-5 |
|---|---|---|---|---|---|---|---|---|---|---|---|
| M | — | — | — | 0.05 | 0.05 | 0.05 | — | — | — | 0.05 | 0.15 |
| Method of charging cross-linking agent | When mixing rubber | When mixing rubber | When mixing rubber | When mixing rubber | When mixing rubber | At twin-screw mixing | When mixing rubber | When mixing rubber | When mixing rubber | When mixing rubber | When mixing |
| Gelation rate (%) | 83 | 85 | 85 | 75 | 75 | 73 | 48 | 40 | 78 | Rubber scorching when mixing | 97 |
| Young's modulus (MPa) | 87 | 70 | 51 | 60 | 67 | 63 | 61 | 58 | 70 | — | 92 |
| Air permeation coefficient ($\times 10^{-12}$ cc · cm/cm$^2$ · sec · cmHg) | 11 | 14 | 18 | 13 | 9 | 8 | 8 | 9 | 87 | — | 10 |
| 40% compression set durability (10,000X) | 260 | 400 | Stopped after 500 | Stopped after 500 | Stopped after 500 | 460 | 40 | 10 | 350 | — | 40 |
| Tire inside appearance | Good | Good | Fair | Good | Good | Good | Good | Good | Poor | — | Good |
| Air leakage performance (% drop internal pressure/month) | 1.8 | 2.2 | 2.8 | 2.2 | 1.7 | 1.6 | 1.6 | 1.7 | 13.5 | — | 1.8 |
| Tire durability | Good | Good | Good | Good | Good | Good | Poor | Poor | Good | — | Poor |
| Mw/Mn after matrix resin extraction | 2.5 | 2.3 | 2.2 | 2.8 | 2.8 | 4.9 | 2.6 | 2.5 | Not measured | — | 3.5 |

As seen from the results of Table I-1, it was learned that the tires of Examples I-1 to I-6 using thermoplastic elastomer compositions according to the present invention as the tire air permeation preventive layer are all superior in flexibility and durability and superior in the tire inside appearance and air permeation preventive property and, further, are superior in terms of the fatigue endurance and maintain a good balance of these properties.

Example II-1 and Comparative Examples II-1 to II-3

The components and ratios of formulation (parts by weight) of the rubber composition (A) and rubber composition (D) used in Example II-1 and Comparative Examples II-1 to II-3 and the measurements of their melt viscosities are shown in the following Table II-1.

TABLE II-1

| Rubber composition | Rubber composition (A) | Rubber composition (D) |
|---|---|---|
| Br-IPMS (Exxpro 89-1) | 100 | — |
| Br-IPMS (Exxpro 89-4) | — | 100 |
| Zinc white | 0.15 | 0.15 |
| Stearic acid | 0.6 | 0.6 |
| Zinc stearate | 0.3 | 0.3 |
| Viscosity (poise), 230° C., 1150/s (no vulcanization system when measuring viscosity) | 1900 | 2100 |

(Note)
*1: The vulcanization system of the rubber composition mixed in advance by Bambury mixer.
*2: Br-IPMS: Bromide of isobutylene-p-methylstyrene copolymer (made by Exxon Chemical).

Further, the components and ratios of formulation (parts by weight) of the resin (B) used in Example II-1 and Comparative Examples II-1 to II-3 and the measurements of their melt viscosities are shown in the following Table II-2.

TABLE II-2

| Resin (B) | Resin (1) | Resin (2) | Resin (3) |
|---|---|---|---|
| Nylon 666 (Amilan CM6001/Toray) | 50 | — | — |
| Nylon 666 (5013B/Ube Industry) | — | 50 | 50 |
| Nylon 11 (Rilsan BMN 0/Atochem) | — | — | 50 |
| Nylon 11 (Rilsan BESN 0 TL/Atochem) | 50 | 50 | — |
| Viscosity (poise), 230° C., 1150/s | 1900 | 1050 | 800 |

The test methods used for evaluation of the Examples and Comparative Examples were as follows:

1) Melt Viscosity

Here, the melt viscosity means the melt viscosity of any temperature and composition at the time of the mixing. The melt viscosity of a polymer material is dependent on the shear rate (sec$^{-1}$) and shear stress, and therefore, the stress and shear rate of the polymer material at any temperature in the molten state flowing through a capillary tube, in particular, the temperature region at the time of mixing, were measured and the melt viscosity measured by the following formula (1):

$$\eta = \delta/\gamma \qquad (1)$$

(where, $\delta$: shear force, $\gamma$: shear rate)

Note that for the measurement of the melt viscosity, a capillary rheometer Capillograph 1C made by Toyo Seiki was used.

2) Test Methods of Tensile Strength and Elongation

This was based on JIS K6251 "Tensile Test Method of Vulcanized Rubber". The thermoplastic elastomer composition prepared by the mixing was pelletized, then passed through a T-die by a single-screw extruder to form it into a film of a width of 350 mm and thickness of 100 µm. The obtained film was punched out into JIS No. 3 dumbbell shapes in parallel to the direction of extrusion at the time of extrusion of the film.

3) Method of Measurement of Rubber Particle Size

The film prepared in the test of the tensile strength and elongation was cut by a microtome etc. to prepare ultrathin slices which were then dyed by $O_sO_4$ etc. and directly examined using a transmission electron microscope (Hitachi H-800 Type).

4) Constant Strain Test

Rubber-based cement of the formulation shown in the test method of Examples I-1 etc., that is, "3) Test Method of 40% Compressive Set Durability", was brushed on a thermoplastic elastomer composition film and dried. Tire carcass use rubber (no carcass) of the formulation shown in the test method of Examples I-1 etc., that is, "3) Test Method of 40% Compressive Set Durability", was superposed on this, then the assembly was vulcanized at 180° C. for 10 minutes to prepare a 2 mm thick film/rubber laminate. This was punched out to a JIS No. 2 dumbbell shape which was used for a durability test at a cycle of 5 Hz while applying 40% constant strain. (Note: the test was stopped for samples not breaking after 10,000,000 times.)

5) Tire Durability Test

As explained above.

The settings of the conditions in the first mixing process and the second mixing process of Example II-1 and Comparative Examples II-1 to II-3 and the test results are shown in the following Table II-3.

conditions of the Examples shown in the following Table III-1 was pelletized, then passed through a T-die by a single-screw extruder to form a film of a width of 350 mm and thickness of 100 μm. These were used for test samples of the tests.

Preparation of Test Samples

First, the rubber component of Table III-1 was mixed using an internal mixer, then extruded into strands and pelletized. Next, the matrix resin component, dispersed resin component, and rubber component were dry blended, then charged from a first charging port of a JSW TEX44 twin-screw mixing extruder and melt mixed at 230° C. for about 10 minutes. The mixed matter obtained was extruded from the front of the twin-screw mixing/extruder into strands, water-cooled, and then pelletized. The pelletized mixed matter was melted by a 40 mm diameter single-screw extruder for a resin at a speed of 40 rpm at 230° C. to prepare a film having a width of 350 mm and thickness of 100 μm.

Note that the melt viscosities of the rubber and resin components of the thermoplastic elastomer composition used in the preparation of the test samples were as shown below.

TABLE II-3

|  |  | Ex. II-1 | Comp. Ex. II-1 | Comp. Ex. II-2 | Comp. Ex. II-3 |
|---|---|---|---|---|---|
| First mixing process | Resin (1) | 50 | 35 | — | — |
|  | Resin (2) | — | — | 50 | — |
|  | Resin (3) | — | — | — | 35 |
|  | Rubber composition (A) | 50 | 65 | 50 | 65 |
| Second mixing process | First mixing composition (C) | 70 | — | 70 | — |
|  | Rubber composition (D) | 30 | — | 30 | — |
|  | Rubber composition/resin ratio (wt %) | 65/35 | 65/35 | 65/35 | 65/35 |
| Viscosity ratio (rubber composition/resin) | First mixing process | 1 | Mixing impossible | 1.8 | 2.4 |
|  | Second mixing process | 1.1 |  | 1.5 | — |
|  | Tensile strength (MPa) | 31 | — | 24 | 21 |
|  | Elongation (%) | 450 | — | 350 | 330 |
|  | Rubber particle size (μm) | 0.5 | — | 3.5 | 5 |
|  | Constant strain set test | Stopped after 10 million times | — | 6 million times | 4 million times |
|  | Tire durability test | Good | — | Fair | Poor |

Figure 1:
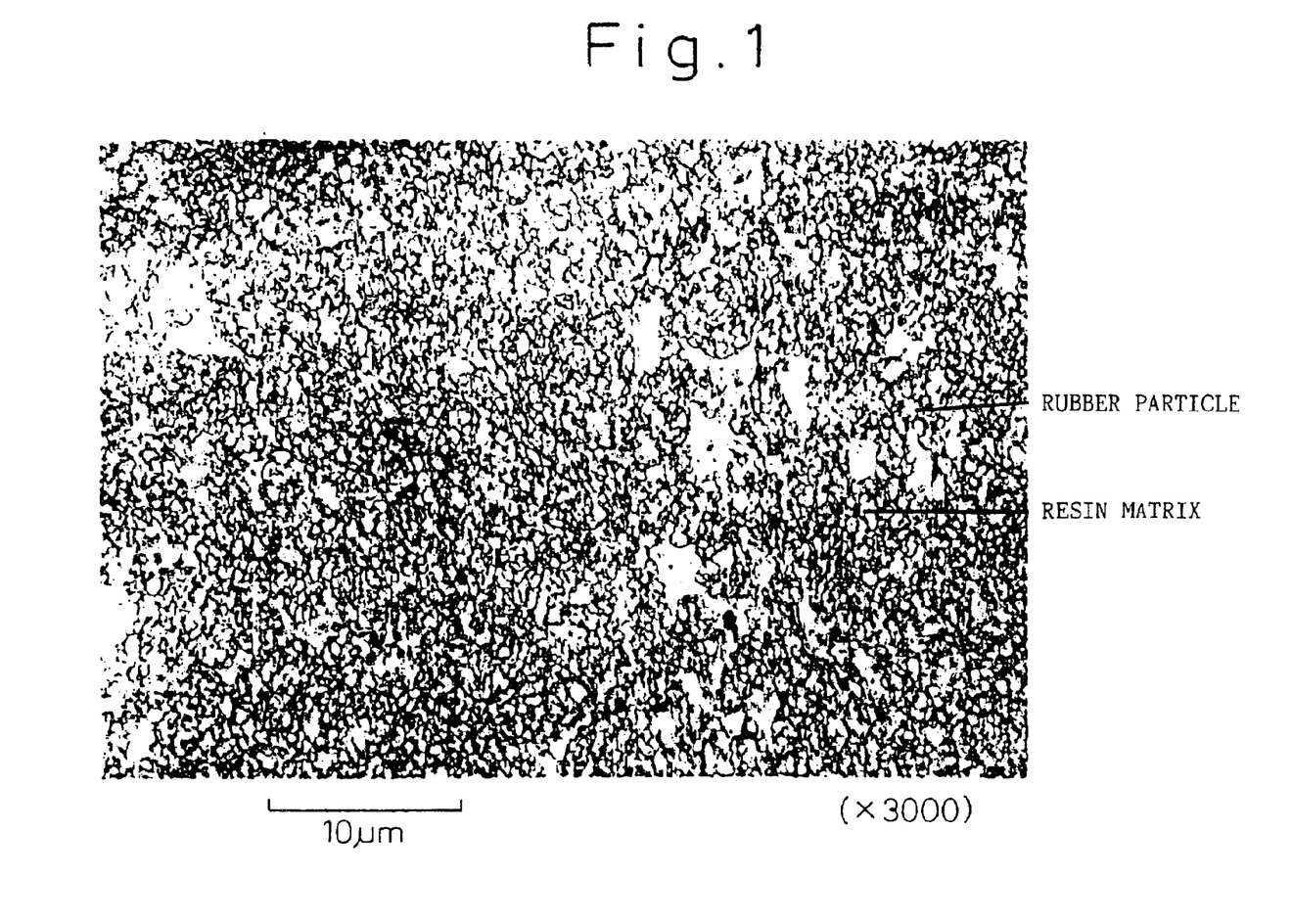
FIG. 1 is a view of the microstructure obtained by a micrograph (X3000) of a thermoplastic elastomer composition obtained according to Example II-1 of the present invention.
Figure 2:
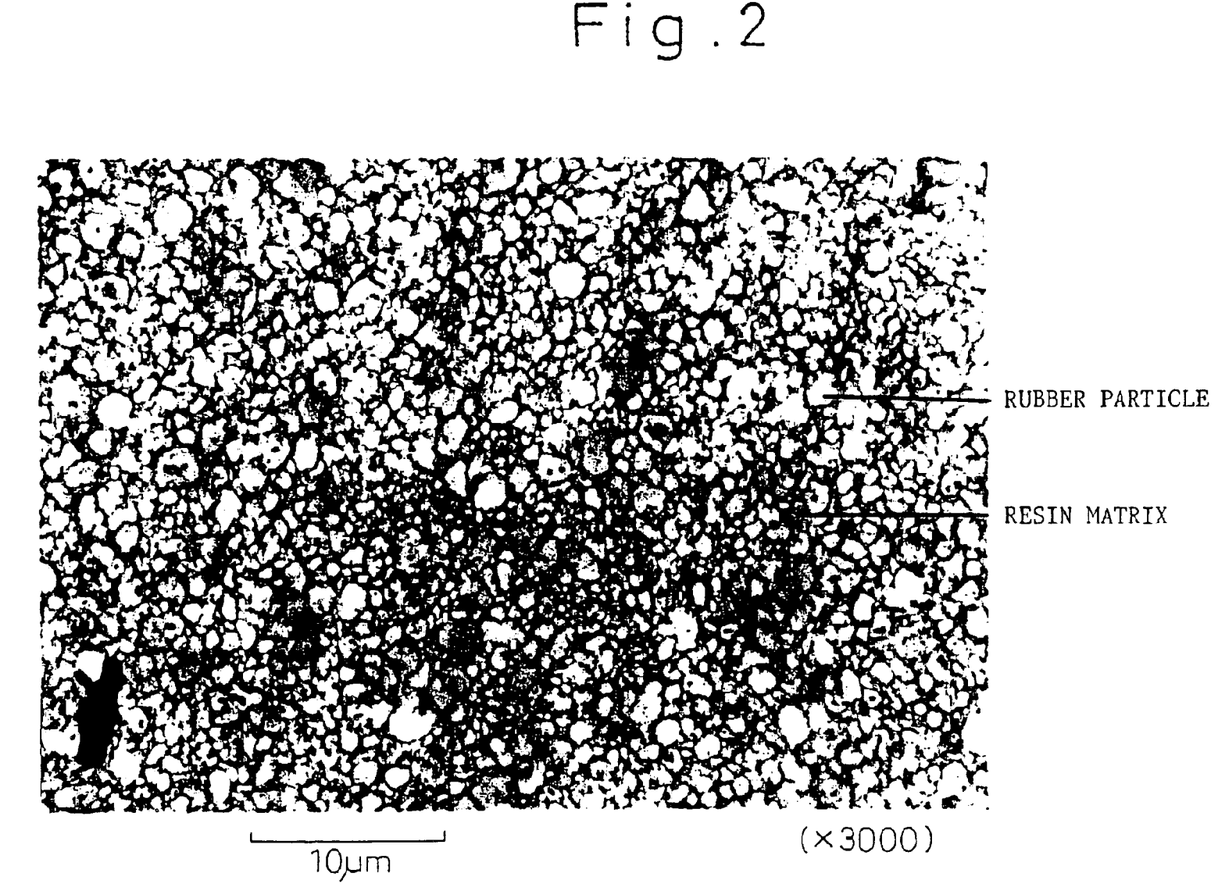
FIG. 2 is a view of the microstructure obtained by a micrograph (X3000) of a thermoplastic elastomer composition obtained according to Comparative Example II-2.

Further, the microstructures in the thermoplastic elastomers obtained by Example II-1 and Comparative Example II-2 are shown in FIG. 1 and FIG. 2.

The following is learned from the results of Table II-3 and FIGS. 1 and 2.

From Comparative Examples II-1 and II-3, it is learned that in the conventional production processes, it is necessary to raise the ratio of viscosities for increasing the rubber component (give a difference). However, by raising the ratio of viscosities, the rubber particle size becomes larger and, as a result, the constant strain test resistance and the tire durability are decreased. Further, from a comparison of Example II-1 and Comparative Example II-2, it is learned that by controlling the ratio of viscosities, the rubber particle size becomes smaller and the constant strain test resistance and tire durability become better. Therefore, by using the present invention, it is possible to obtain a thermoplastic elastomer composition which is flexible, high in strength, high in elongation, and superior in durability.

Examples III-1 to III-5 and Comparative Examples III-1 to III-2

Each of thermoplastic elastomer compositions prepared by mixing according to the components and formulation

|  | Melt viscosity (poise) at 230° C., 1150/sec |
|---|---|
| Br-IPMS rubber composition (Exxpro 89-4, Exxon Chemical) | 1030 |
| N11 resin (Rilsan BMN 0, Atochem) | 855.7 |
| N12 resin (Rilsan AMN 0, Atochem) | 840 |
| N612 resin (D-18, Daicel-Hüls) | 1047 |
| N666 resin (1) (5613B, Ube Industry) | 995.3 |
| N666 resin (2) (Amilan CM6001, Toray) | 1800 |

The test methods used for evaluation in the Examples and Comparative Examples were as follows:

Melt Viscosity

As explained above.

Compressive Set Test

Rubber-based cement of the formulation shown in the test methods of Examples I-1 etc., that is, "3) Test Method of 40% Constant Strain Durability", was brushed on a thermoplastic elastomer composition film and dried. The tire carcass use rubber (no carcass) of the formulation shown in the test methods of Examples I-1 etc., that is, "3) Test Method of 40% Constant Strain Durability", was superposed, then the assembly was vulcanized at 180° C. for 10 minutes to prepare a 2 mm thick film/rubber laminate. This was punched out to a JIS No. 2 dumbbell shape which was used for a durability test at a cycle of 5 Hz while applying 30.6% strain. (The test was stopped for samples not breaking after 10,000,000 times.)

Test Method of Air Permeation Coefficient of Film

As explained above.

Measurement Method of Particle Size of Rubber and Dispersed Resin

The prepared film was cut by a microtome etc. to prepare ultrathin slices which were then dyed by $RuO_4$ etc. and directly examined using a transmission electron microscope (Hitachi H-800 Type).

The test results of Examples III-1 to III-5 and Comparative Examples III-1 to III-2 are shown in the following Table III-1.

Industrial Applicability

In the present invention, by controlling the dispersed particle size of the rubber in the thermoplastic elastomer composition and the blended resin structure of the matrix phase, it was found that the durability, particularly the durability up to stringent times of 10° C., 0° C., −20° C., or −40° C. was remarkably improved while maintaining the gas permeation preventive property. Therefore, the thermoplastic elastomer composition of the present invention can be effectively used as a member of a product requiring durability such as elongation flexural fatigue in a wide temperature range from ordinary temperature to a low temperature region such as the inner liner member of a pneumatic tire, a hose member, a belt member, and a fender.

What is claimed is:

1. A process for producing a thermoplastic elastomer composition comprising the steps of:

mixing a rubber composition (A) and a thermoplastic resin (B) under conditions of the following equations (I) and (II):

$$(\phi_A/\phi_B) \times (\eta_B/\eta_A) < 1.0 \tag{I}$$

$$0.8 < (\eta_A/\eta_B) < 1.2 \tag{II}$$

wherein $\phi_A$: volume fraction of rubber composition (A), $\phi_B$: volume fraction of resin (B), $\eta_A$: melt viscosity of rubber

TABLE III-1

|  | Ex. III-1 | Comp. Ex. III-1 | Ex. III-2 | Comp. Ex. III-2 | Ex. III-3 | Ex. III-4 | Ex. III-5 |
|---|---|---|---|---|---|---|---|
| Rubber: IPMS formulation *1 | 45 | 45 | 45 | 45 | 45 | 45 | 45 |
| Thermoplastic resin |  |  |  |  |  |  |  |
| N11 | 33 | 33 | 44 | 44 | 11 | — | — |
| N12 | — | — | — | — | — | 33 | — |
| N612 | — | — | — | — | — | — | 33 |
| N666 (1) | 22 | — | 11 | — | 44 | 22 | 22 |
| N666 (2) | — | 22 | — | 11 | — | — | — |
| Rubber/resin ratio | 45/55 | 45/55 | 45/55 | 45/55 | 45/55 | 45/55 | 45/55 |
| Rubber/resin viscosity ratio | 1.13 | 0.84 | 1.18 | 0.99 | 1.06 | 1.14 | 1.02 |
| N666/N11 (or N12, or N612) ratio | 4/6 | 4/6 | 2/8 | 2/8 | 8/2 | 4/6 | 4/6 |
| N666/N11 (or N12, or N612) viscosity ratio | 1.16 | 2.14 | 1.16 | 2.14 | 0.86 | 1.18 | 1.05 |
| Constant Strain Durability test 10° C. (10000X) | 1000> | 600 | 1000> | 600 | 1000> | 1000> | 1000> |
| Test −20° C. (10000X) | 790 | 20 | 1000> | 300 | 500 | 810 | 1000> |
| Air permeation coefficient × $10^{-12}$ (cc · cm/cm² · sec · cmHg) | 15.8 | 16.0 | 28.0 | 27.5 | 10.4 | 20.3 | 18.1 |
| Average particle size of resin (μm) | 0.5 to 9 | 15 to 49 | 0.5 to 8.0 | 12 to 35 | 0.5 to 8.0 | 0.8 to 10 | 0.5 to 5.0 |
| Average particle size of rubber (μm) | 1.5 to 8.0 | 10 to 20 | 1.0 to 8.0 | 0.5 to 6.0 | 1.0 to 7.0 | 1.0 to 10 | 0.6 to 6.0 |

(Note) *1:

| Composition of Br-IPMS Formulation | Parts by Weight |
|---|---|
| Br-IPMS (Exxpro 89-4, made by Exxon Chemical) | 100 |
| ZnO (Zinc White No. 3, made by Seido Chemical) | 0.5 |
| Stearic acid (Beads Stearic Acid, made by NOF Corporation) | 2 |
| Zinc stearate | 1 |

According to the results of Table III-1, it is learned that the compositions of the Examples of the present invention improve the durability under low temperature compared with the Comparative Examples by bringing the viscosity ratio of the blended resin close to 1.

composition (A), $\eta_B$: melt viscosity of resin (B) to form a composition (C); and mixing the resultant composition (C) and a rubber composition (D) under conditions of the following equations (III) and (IV):

$$(\phi_D/\phi_C) \times (\eta_C/\eta_D) < 1.0 \quad \text{(III)}$$

$$0.8 < (\eta_C/\eta_D) < 1.2 \quad \text{(IV)}$$

wherein $\phi_D$: volume fraction of rubber composition (D), $\phi_C$: volume fraction of composition (C), $\eta_D$: melt viscosity of rubber composition (D), $\eta_C$: melt viscosity of composition (C)).

2. A pneumatic tire comprising a thermoplastic elastomer composition prepared by the process according to claim 1, as an air permeation preventive layer of the tire.

* * * * *

UNITED STATES PATENT AND TRADEMARK OFFICE
CERTIFICATE OF CORRECTION

| | | |
|---|---|---|
| PATENT NO. | : 6,861,470 B2 | Page 1 of 1 |
| APPLICATION NO. | : 10/347283 | |
| DATED | : March 1, 2005 | |
| INVENTOR(S) | : Jiro Watanabe et al. | |

It is certified that error appears in the above-identified patent and that said Letters Patent is hereby corrected as shown below:

Title Page -

Delete the "Related U.S. Application Data" information in its entirety and substitute therefor the following:

--Related U.S. Application Data

Item (62) Division of application No. 09/800,782, filed on Mar. 8, 2001, now Pat. No. 6,538,066, which is a division of application No. 09/380,588, filed on Dec. 7, 1999, now Pat. No. 6,359,071, which is a 371 application of application No. PCT/JP99/00019, filed on Jan. 7, 1999. --.

Signed and Sealed this

Nineteenth Day of April, 2011

David J. Kappos
*Director of the United States Patent and Trademark Office*